United States Patent
Koo

[11] Patent Number: 6,133,963
[45] Date of Patent: *Oct. 17, 2000

[54] SYSTEM FOR ECHO CANCELLATION COMPRISING AN IMPROVED GHOST CANCELLATION REFERENCE SIGNAL

[75] Inventor: David Koo, Carmel, N.Y.

[73] Assignee: Philips Electronics North America Corporation, New York, N.Y.

[*] Notice: This patent is subject to a terminal disclaimer.

[21] Appl. No.: 09/065,794

[22] Filed: Apr. 23, 1998

Related U.S. Application Data

[63] Continuation of application No. 08/699,277, Aug. 19, 1996, abandoned, which is a continuation of application No. 07/949,284, Sep. 22, 1992, Pat. No. 5,568,202, which is a continuation of application No. 07/831,600, Feb. 5, 1992, Pat. No. 5,179,444, which is a continuation of application No. 07/698,521, May 10, 1991, Pat. No. 5,121,211, which is a continuation-in-part of application No. 07/693,737, Apr. 30, 1991, Pat. No. 5,111,298, which is a continuation-in-part of application No. 07/595,112, Oct. 9, 1990, Pat. No. 5,047,859.

[51] Int. Cl.⁷ ...................................................... H04N 7/08
[52] U.S. Cl. ........................ 348/614; 348/192; 348/611; 348/607; 455/65; 455/67.1; 455/67.4
[58] Field of Search .................... 348/611, 607, 348/614, 725, 731, 192; 358/463; 455/67.3, 63, 501, 65, 67.1, 67.4; 375/231, 350; H04N 7/08

[56] References Cited

U.S. PATENT DOCUMENTS

| | | | |
|---|---|---|---|
| 5,047,859 | 9/1991 | Koo | 358/187 |
| 5,111,298 | 5/1992 | Koo | 358/187 |
| 5,121,211 | 6/1992 | Koo | 358/187 |
| 5,161,017 | 11/1992 | Sato | 358/166 |
| 5,179,444 | 1/1993 | Koo | 358/187 |
| 5,345,274 | 9/1994 | Matsunaga | 348/614 |
| 5,389,977 | 2/1995 | Lee | 348/614 |
| 5,396,299 | 3/1995 | Greenberg | 348/614 |
| 5,568,202 | 10/1996 | Koo | 348/614 |
| 5,623,319 | 4/1997 | Hill | 348/614 |
| 5,654,766 | 8/1997 | Mcnay | 348/731 |
| 5,742,356 | 4/1998 | Suzuki | 348/614 |
| 5,761,088 | 6/1998 | Hulyakar | 348/614 |

OTHER PUBLICATIONS

"A Tutorial on Ghost Canceling in Television Systems" W. Ciciora et al, IEEE Transactions on Consumer Electronics, vol. CE–25, Feb., 1979.

*Primary Examiner*—Mark R. Powell
*Assistant Examiner*—Wesner Sajous

[57] ABSTRACT

An apparatus for receiving a television signal containing a ghost cancellation reference signal, and for using the reference signal to process the television signal so as to substantially eliminate path induced distortion.

3 Claims, 7 Drawing Sheets

SYSTEM FOR ECHO CANCELLATION COMPRISING AN IMPROVED GHOST CANCELLATION REFERENCE SIGNAL

This application is a continuation of U.S. Ser. No. 08/699,277 filed on Aug. 19, 1996 which is a continuation of Ser. No. 07/949,284, Sep. 22, 1992, U.S. Pat. No. 5,568,202 which is itself a continuation of Ser. No. 07/831,600, Feb. 5, 1992, U.S. Pat. No. 5,179,444, which is a continuation of Ser. No. 07/698,521, May 10, 1991, U.S. Pat. No. 5,121,211, which is a continuation-in part of Ser. No. 07/693,737, Apr. 30, 1991, U.S. Pat. No. 5,111,298, which is a continuation-in part of Ser. No.07/595,112, Oct. 9, 1990, now abandoned.

BACKGROUND OF THE INVENTION

In 1979 the IEEE published an article which has become a basic reference in the field of television echo (or "ghost") elimination. The article is entitled "A Tutorial On Ghost Cancellation in television Systems" and was written by Walter Ciciora, Gary Sgrignoli and William Thomas and it is incorporated by reference herein.

Although the Ciciora article described the fundamental principles, apparatus and algorithms applicable to ghost cancellation, the state of the art has only recently progressed to the point of providing practical ways to implement and improve these basic concepts.

There are two main steps to the echo cancellation process. First the characteristics of the communications channel (which include the echo artifacts, if any) must be determined by the receiver. Once the channel characteristics are calculated, filters are used to implement the inverse channel characteristics to substantially eliminate the echos. The present invention relates to an apparatus and an improved ghost cancellation reference signal, for identifying the characteristics of a communication channel.

Communication engineering continually must deal with the problem of restoring a signal which has been altered by the communication path over which the signal was transmitted. Signal restoration often can be achieved if the communication path is fully characterized, at least as to those parameters which contribute to the signal alteration. Thus, a frequently essential component of the signal restoration problem is that of identifying the characteristics of the communication path or channel.

A straight forward approach to the channel identification problem is to transmit a ghost cancellation reference signal (GCR) having a known characteristic, over the channel, and to receive the transmitted signal after it has passed through the channel. The originally transmitted signal is compared with the received signal, and a model of the channel characteristics is developed based on the comparison.

The Japanese Broadcasting Technology Association (BTA) has adopted a GCR signal that is the time integral of a windowed sin x/x pulse (sinc) which is transmitted on line 18 of the vertical blanking interval (VBI) of a television signal. Although the BTA GCR signal has the necessary flat bandwidth in the frequency domain, its energy is relatively low. The BTA GCR signal therefore may be suboptimal since its low energy limits its performance under high noise conditions. Additional processing time is needed to compensate for the noise present in the channel which increases the time it takes for the echo cancellation system to calculate the channel characteristics when conditions in the channel change. The BTA GCR signal has a fixed time interval which cannot be changed without effecting its frequency spectrum characteristics. This limits the possible applications for which the BTA GCR signal can be used. The time interval for an NTSC television system, for example, would be $\geq 52.5 \mu s$.

Other GCR signals have been proposed which have a higher energy level than the BTA signal. These signals, are cyclic in nature however, and therefore, not effective for detecting pre and post-echoes present in the channel.

SUMMARY OF THE INVENTION

The instant invention comprises a non-cyclic echo cancellation system which utilizes an improved, high energy non-cyclic GCR signal which provides the flat, wide frequency spectrum necessary to fully characterize the channel and which has a high energy level (amplitude) and a more even distribution of energy over a time interval. This time interval can be adjusted according to different system requirements while maintaining the necessary flat frequency response over the desired frequency range. The GCR signal of the invention can therefore be adapted for use in non-conventional television systems such as those providing high definition and enhanced definition television, as well as for other communication applications such as echo cancellation in telephony and microwave systems, for example.

DETAILED DESCRIPTION OF PREFERRED EMBODIMENTS OF THE INVENTION

There are normally two main steps involved in cancelling echoes which occur during the transmission of television signals. First the characteristics of the communication channel (which include the echo artifacts, if any) must be determined at the receiver. From these characteristics, an inverse channel characteristic is derived in the form of a sequence of filter coefficients. These coefficients are then provided to filters which are used to implement the inverse channel processing, i.e. the echo cancellation.

A received video signal contains echoes which are comprised of superimposed copies of the originally transmitted signal, which have different delay times and amplitudes. The strongest signal component represents the originally transmitted or main signal component. Looking in the time domain, any echo component occurring before the main signal component is called a "pre-echo" and any copy occurring after the main signal component is called a "post-echo".

Figure 1:
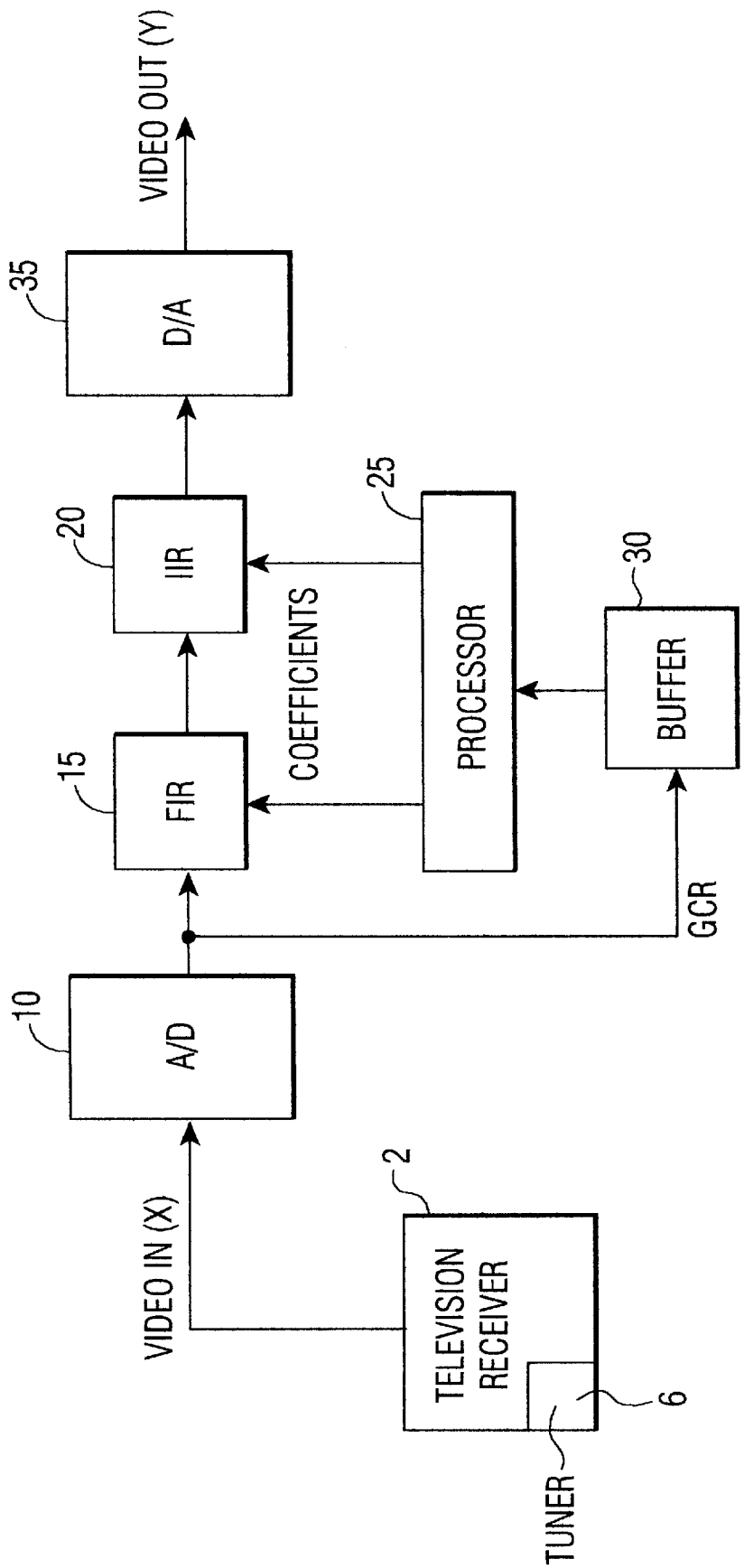
FIG. 1 is a block diagram of one embodiment of an echo cancellation circuit comprising the invention.

FIG. 1 describes an echo cancellation circuit which can be used to cancel both types of echoes. Such a circuit can be part of a television receiver 2 which receives a television signal comprising the GCR signal. The signal is received by the tuner 6 of the receiver and converted to digital form using analog to digital converter 10. An IIR filter 20 is used to cancel post-echos and an FIR filter 15 is used to cancel pre-echoes. Echo cancellation circuits of this type are described in more detail in U.S. Pat. No. 5,161,017 which is specifically incorporated by reference herein.

Video samples are received and input to A/D converter 10 and the GCR signal, which is transmitted during the vertical blanking interval of the television signal, is separated and fed to a buffer memory 30. The GCR signal, which has been distorted according to the channel characteristics, is sometimes sampled over a number of frames, and an average of these samples is then fed to processor 25 which can be a microprocessor or a digital signal processor. The processor comprises a memory which contains a pre-processed and stored version of the GCR as transmitted, and the contents of buffer 30 is compared to the stored version of the GCR in processor 25 and from this comparison, the impulse response of the channel can be modeled. This channel model is then used to compute a sequence of coefficients for the filters which implement the inverse channel characteristic of the channel to suppress the echoes which are present.

The parent application ('112) describes a method and apparatus for restoring a received signal wherein no assumptions are made about the communication channel characteristics other than that the signal and channel interaction is described by linear system theory. Consequently, the channel is characterized completely by its impulse response.

The sequence of channel impulse response function samples thus obtained by processing the test signal, serves to provide the correct sequence of coefficients to filters 15 and 20. After the filter coefficients are fed to the filters, the complete television signal is processed through these filters whereby the echo components are substantially reduced. The output of the IIR filter 20 is then fed to a digital-to-analog converter (D/A) 35 and presented as a video output signal to the video display of the receiver.

The GCR signal is used to characterize the frequency or impulse response of the channel (including the transmitter and receiver, as well as the actual transmission path). It is therefore required that the frequency spectrum of the GCR signal used in a conventional television system must be low-pass and contained entirely in the 4.3 MHz. pass band of the NTSC signal. In addition, it must be as flat as possible in that band. If there is a null in the spectrum of the GCR signal, where the spectrum is near zero over some frequency interval, then the channel will not be adequately characterized over that interval. Even if there is a rolloff in the spectrum, where the spectrum is significantly less then the peak value, then in the presence of noise, the accuracy of the channel characterization will suffer for the frequencies where the rolloff occurs.

Figure 2:
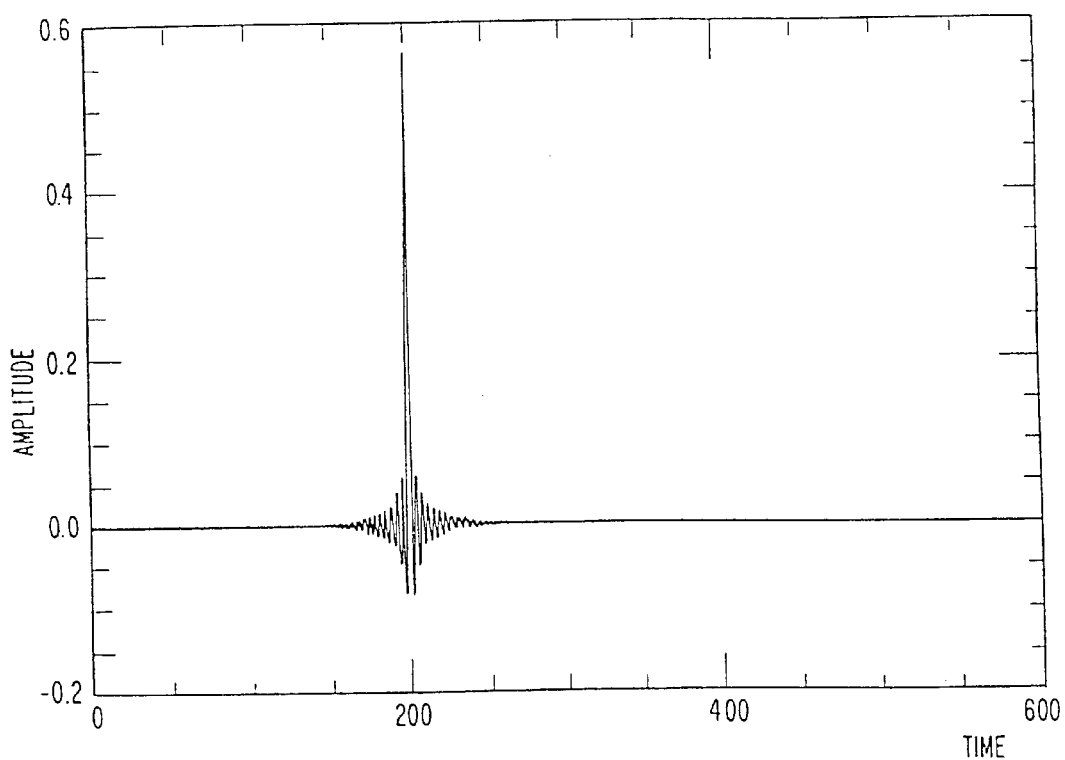
FIG. 2 is a graph of the BTA GCR signal.

FIG. 2 is a graph, in the time domain, of the BTA GCR signal. This is the signal as transmitted and as stored in ROM 10 and/or a processed version of which is stored in ROM 10. Before this signal is transmitted, it is integrated and inserted in the blanking interval of each field of the television signal. When viewed in the frequency domain (FIG. 3) it is clear that the BTA GCR signal provides the necessary bandwidth characteristics for effective channel characterization. When viewed in the time domain (FIG. 2) however, it can be seen that the amplitude versus time characteristic of the BTA GCR signal has relatively little energy. This results in poor performance in a noisy environment.

The invention comprises an improved, non-cyclic GCR signal which features higher energy and improved energy distribution with respect to both time and frequency, and at the same time, the wide and flat bandwidth necessary for effective channel characterization.

Figure 4:
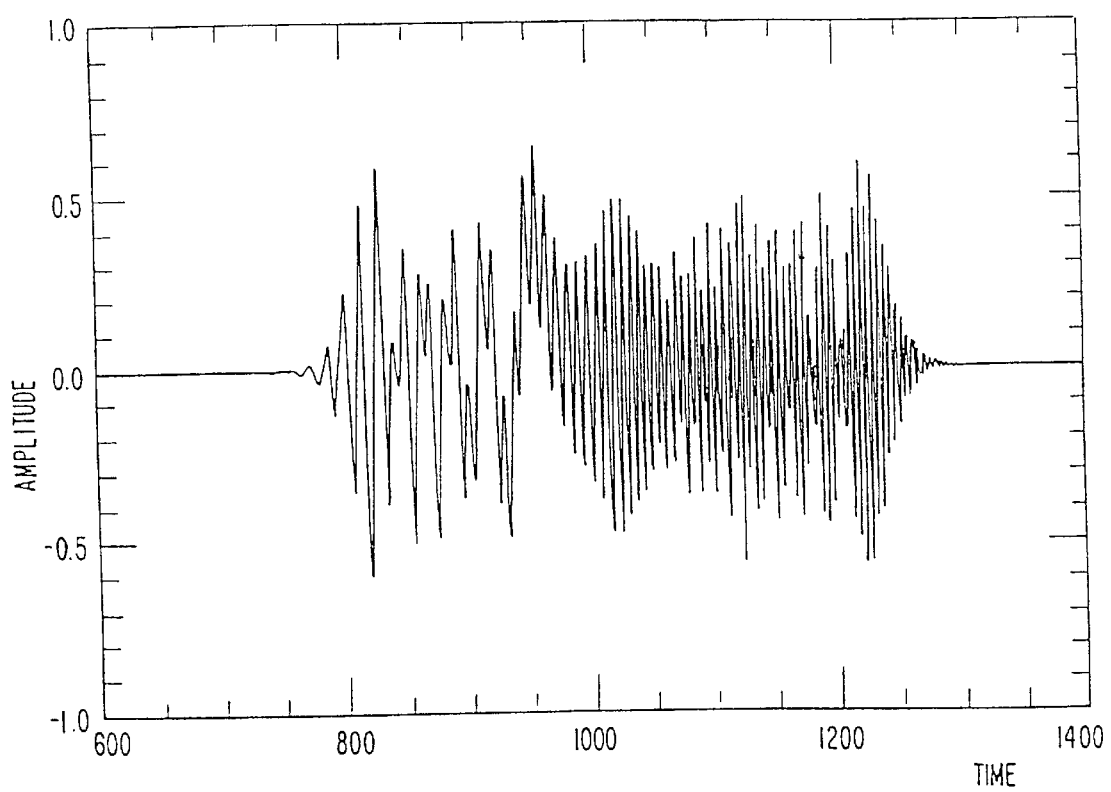
FIG. 4 is a graph of a first embodiment of a GCR signal comprising the invention.

FIG. 4 is a graph of a first embodiment of the improved GCR signal. This GCR signal has a higher energy level with peaks more evenly distributed in time than the BTA GCR signal shown in FIG. 2.

Figure 3:
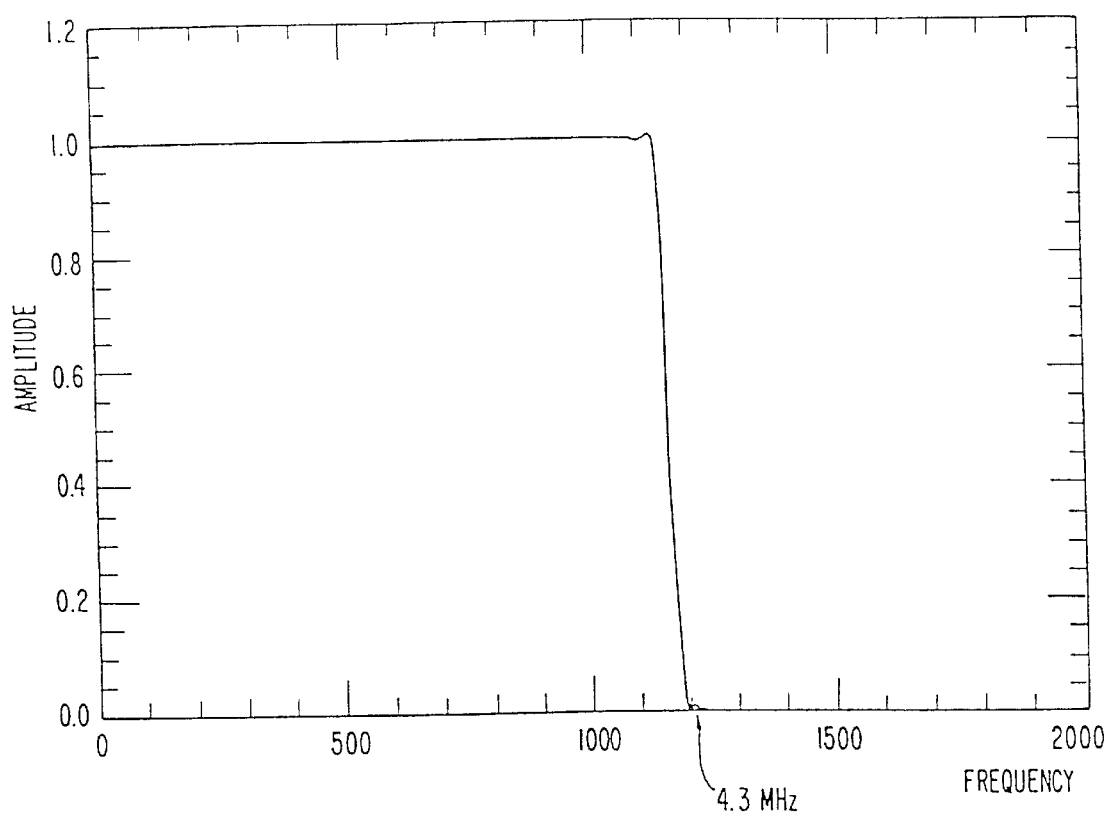
FIG. 3 is a graph of the frequency spectrum of the BTA GCR signal.
Figure 5:
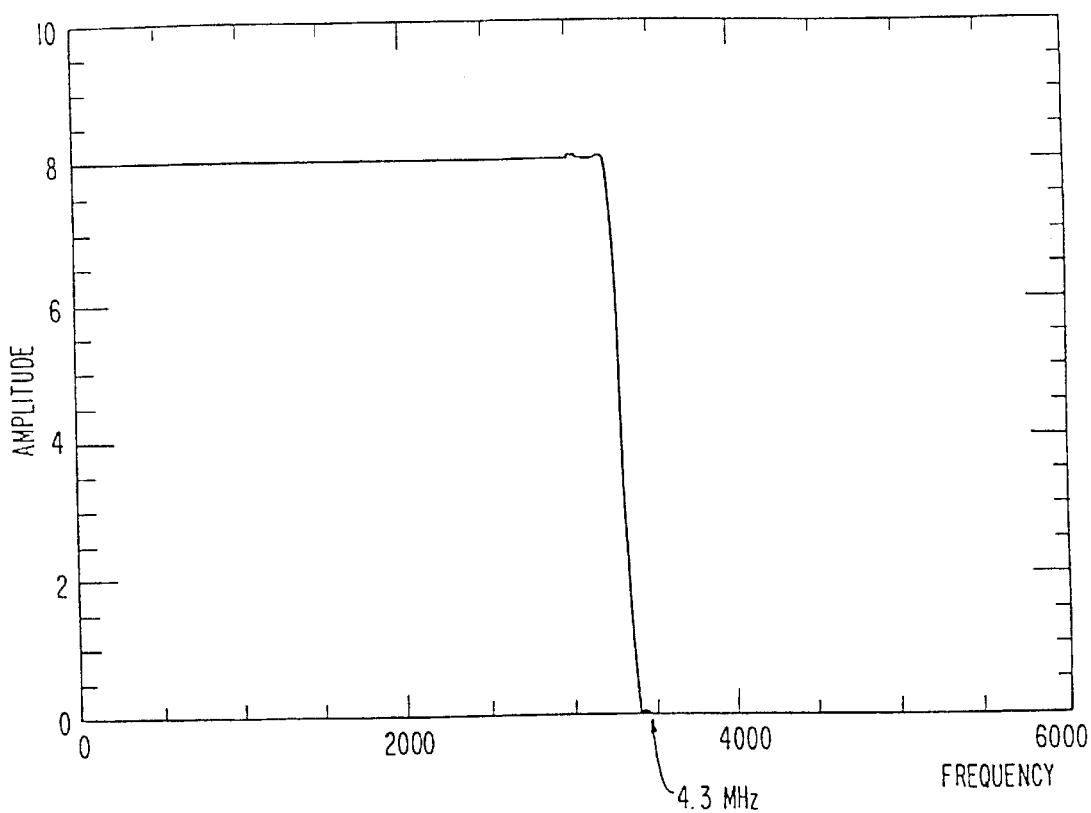
FIG. 5 is a graph of the frequency spectrum of the GCR signal of FIG. 4.

As shown in the frequency spectrum, FIG. 5, this GCR signal has a very flat spectrum in the band of interest and a higher energy level with respect to frequency (about eight times higher) than the BTA GCR signal shown in FIG. 3.

The equation which describes this embodiment of the GCR signal is:

$$f(t) = \frac{1}{2\pi} \int_{-\Omega}^{\Omega} [A\cos(\alpha \varepsilon(\omega)) + Aj\sin(\alpha \varepsilon(\omega))] W(\omega) e^{j\omega t} d\omega.$$

$$\text{where } \varepsilon(\omega) = \sum_{n=1}^{N} C_n \sin\left(nb\frac{\pi}{\Omega}\omega\right)$$

where $\alpha$, $A$, $C_n$, $b$ and $\Omega$ are real parameters.

where $N$ is an integer parameter.

where $W(\omega)$ is a windowed window function.

A Hamming or Hanning window is used in this example however other windows can also be used.

The parameters are in the range of from 0 to $10^{12}$. For this example $N=7$, $C_1=60$, $C_3=10$, $C_5=3$, $C_7=-1$, $C_{even}=0$, $A=1$ $\Omega=4.2\times2\times10^6$Rad (where $\Omega$ equals the end of the frequency band of interest, which in this case is 0 to 4.2 MHz.).

Figure 6:
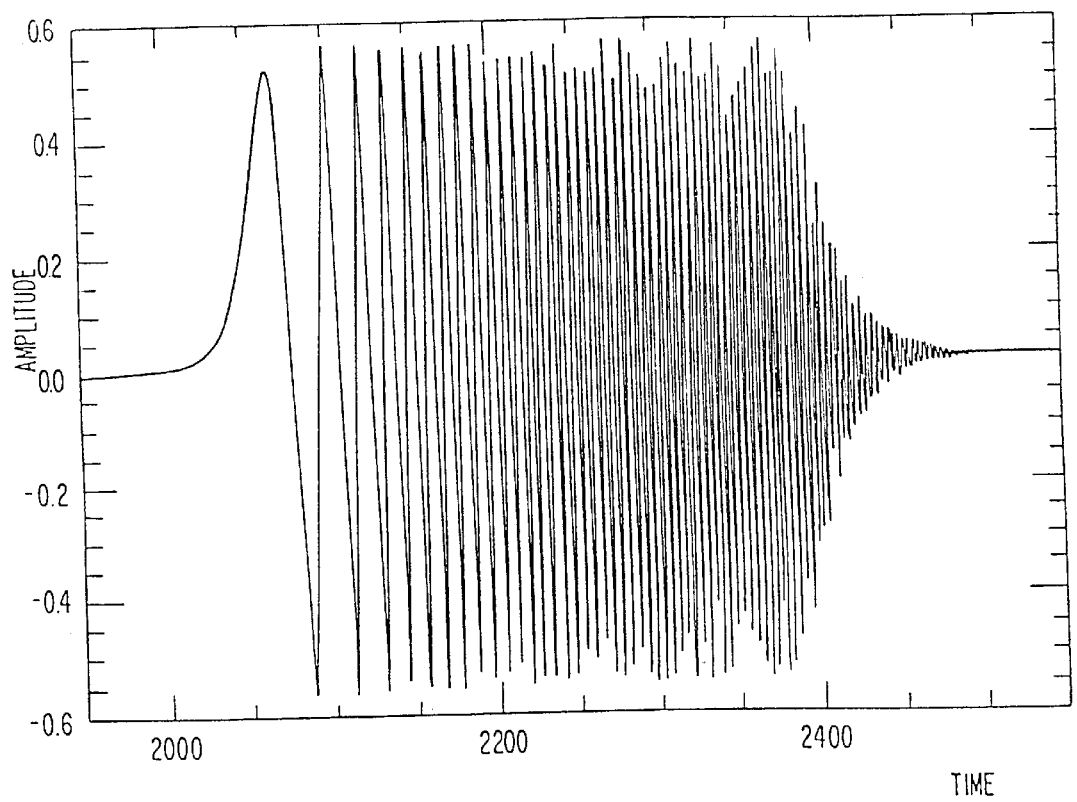
FIG. 6 is a graph of a second embodiment of a GCR signal comprising the invention.

FIG. 6 is a graph of a second embodiment of the improved GCR signal. This GCR signal has a higher energy level with peaks more evenly distributed in time than the BTA GCR signal shown in FIG. 2.

Figure 7:
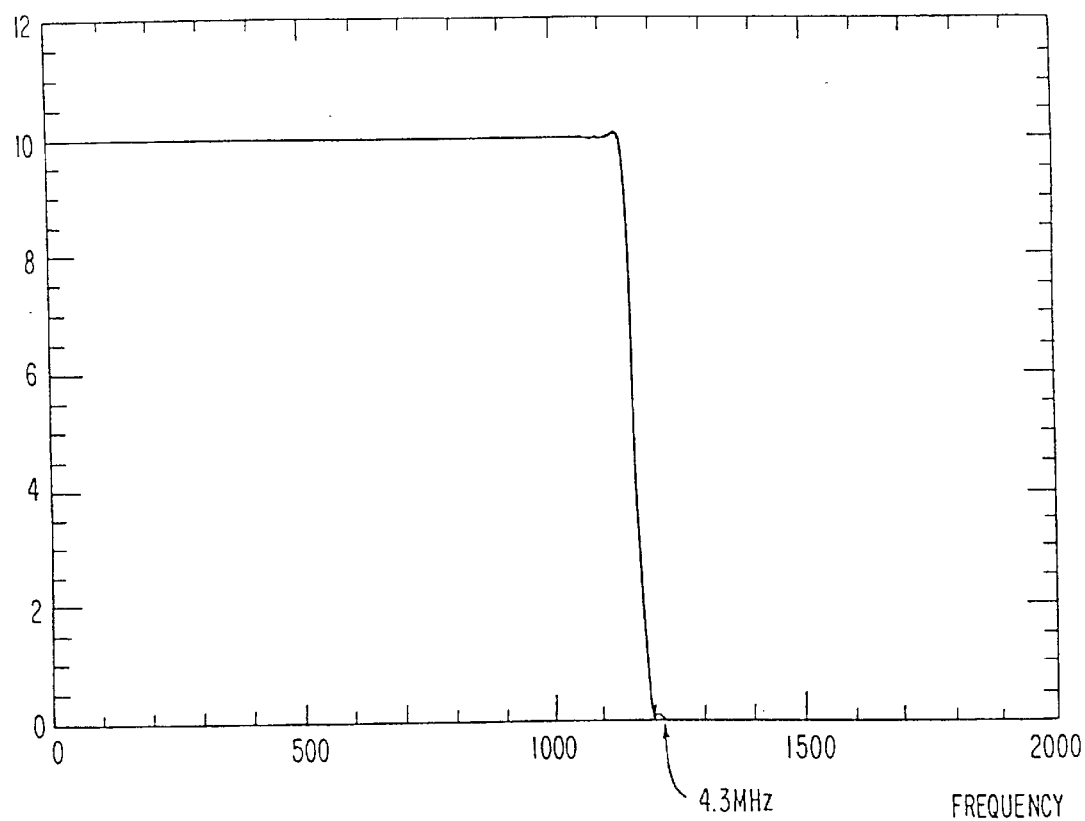
FIG. 7 is a graph of the frequency spectrum of the GCR signal of FIG. 6.

As shown in the frequency spectrum, FIG. 7, this GCR signal has a very flat spectrum in the band of interest and a higher energy level with respect to frequency (about ten times higher) than the BTA GCR signal shown in FIG. 3.

The equation which describes this embodiment of the GCR signal is:

$$f(t) = \frac{1}{2\pi} \int_{0}^{\Omega} [A\cos(b\omega^2) + Aj\sin(b\omega^2)] W(\omega) e^{j\omega t} d\omega +$$

$$\frac{1}{2\pi} \int_{-\Omega}^{0} [A\cos(b\omega^2) - Aj\sin(b\omega^2)] W(\omega) e^{j\omega t} d\omega$$

where $A$, $b$ and $\Omega$ are real parameters; and where $W(\omega)$ is a windowed window function.

A Hamming or Hanning window is used in this example however other windows can also be used.

The parameters are in the range of from 0 to $10^{12}$. For this example $A=1$, $b=0.0004$ and $\Omega=4.2\times2\times10^6$Rad (where $\Omega$ equals the end of the frequency band of interest, which in this case is 0 is to 4.2 MHz.).

The foregoing disclosure and description of the invention is illustrative and explanatory thereof and various changes in the methods and apparatus indicated herein may be made within the scope of the appended claims without departing from the spirit of the invention.

I claim:

1. An apparatus for receiving a television signal which has been provided over a communications path and subjected to path induced distortion, said television signal comprising a reference signal, said apparatus comprising:

(a) a tuner means for receiving said television signal;

(b) an analog to digital converter for digitizing said television signal; and (c) a processor means for separating from said digitized television signal, said reference signal as distorted by said communications path, and for generating from said distorted reference signal, a plurality of filter coefficients so as to substantially eliminate said path induced distortion from said received television signal;

wherein said reference signal at a point prior to its transmission over said communications path, is non-cyclic, has a substantially flat frequency response within the bandwidth of said communications path, and a plurality of substantially uniform amplitude peaks over a time interval.

2. The apparatus of claim 1 wherein said reference signal defined by the equation:

$$f(t) = \frac{1}{2\pi}\int_{O}^{\Omega}[A\cos(b\omega^2) + Aj\sin(b\omega^2)]W(\omega)e^{j\omega t}d\omega +$$
$$\frac{1}{2\pi}\int_{-\Omega}^{O}[A\cos(b\omega^2) - Aj\sin(b\omega^2)]W(\omega)e^{j\omega t}d\omega$$

where A, b and $\Omega$ are real numbers; and where $W(\omega)$ is a windowed window function.

3. The apparatus of claim 1 wherein said reference signal defined by the equation:

$$f(t) = \frac{1}{2\pi}\int_{-\Omega}^{\Omega}[A\cos(\alpha\,\varepsilon(\omega)) + Aj\sin(\alpha\,\varepsilon(\omega))]W(\omega)e^{j\omega t}d\omega.$$

$$\text{where } \varepsilon(\omega) = \sum_{n=1}^{N}C_n\sin\left(nb\frac{\pi}{\Omega}\omega\right)$$

where $\alpha$, A, $C_n$, b and $\Omega$ are real numbers;

where N is an integer; and where $W(\omega)$ is a windowed window function.

\* \* \* \* \*